US012673606B1

(12) United States Patent
Saul

(10) Patent No.: US 12,673,606 B1
(45) Date of Patent: Jul. 7, 2026

(54) UNIVERSAL TAIL LIGHT ENCLOSURE FOR A TOWED VEHICLE

(71) Applicant: American Manufacturing Operations, Inc., Toledo, OH (US)

(72) Inventor: Jonathan R. Saul, Lasalle, MI (US)

(73) Assignee: American Manufacturing Operations, Inc., Toledo, OH (US)

( * ) Notice: Subject to any disclaimer, the term of this patent is extended or adjusted under 35 U.S.C. 154(b) by 0 days.

(21) Appl. No.: 19/181,665

(22) Filed: Apr. 17, 2025

(51) Int. Cl.
| | |
|---|---|
| *B60Q 1/00* | (2006.01) |
| *B60Q 1/30* | (2006.01) |
| *F21S 43/27* | (2018.01) |
| *F21V 17/16* | (2006.01) |

(52) U.S. Cl.
CPC .............. *B60Q 1/305* (2013.01); *F21S 43/27* (2018.01); *F21V 17/16* (2013.01)

(58) Field of Classification Search
CPC ........... B60Q 1/305; F21S 43/27; F21V 17/16
See application file for complete search history.

(56) References Cited

U.S. PATENT DOCUMENTS

| | | | |
|---|---|---|---|
| 3,032,646 A | 5/1962 | Chieger | |
| 3,106,349 A | 10/1963 | Bloodgood, Jr. | |
| 3,819,926 A | 6/1974 | Hess | |
| 4,617,617 A | 10/1986 | Cunningham et al. | |
| 5,060,121 A | 10/1991 | Cunningham et al. | |
| 5,508,894 A | 4/1996 | Payne et al. | |
| 5,980,065 A | * | 11/1999 | Wooderson ............. F21S 43/19 |
| | | | 362/267 |
| 7,594,816 B1 | * | 9/2009 | Wang ..................... H01R 31/00 |
| | | | 439/35 |
| 9,896,021 B2 | * | 2/2018 | Speropoulos .......... B60Q 1/305 |
| 11,199,308 B1 | * | 12/2021 | Cathey ................ B60Q 1/0035 |
| 2007/0293061 A1 | | 12/2007 | Keller |
| 2013/0242584 A1 | * | 9/2013 | Smith ..................... B60Q 1/56 |
| | | | 362/485 |

OTHER PUBLICATIONS

Hopkins C7425 LED submersible combination trailer light (https://hopkinstowingsolutions.com/products/trailer-lighting/stop-tail-turn/c7425.html) (Year: 2024).*

* cited by examiner

*Primary Examiner* — Gerald J Sufleta, II
(74) *Attorney, Agent, or Firm* — Harness, Dickey & Pierce, P.L.C.

(57) ABSTRACT

A universal tail light enclosure includes a rear housing member including a base plate having a first end, a second end, a first side and a second side. A first mounting plate including first connector members projects from base plate, and a second mounting plate including second connector members projects from the base plate. A front housing member includes a light support plate having a first end portion, a second end portion, a first side portion, and a second side portion. A first side plate extends from the first end portion and includes first connector elements and a first mounting section. A second side plate extends from the second end portion and includes second connector elements and a second mounting section. The universal tail light enclosure is configured to mount to a trailer light support through either the first mounting section or the second mounting section.

20 Claims, 6 Drawing Sheets

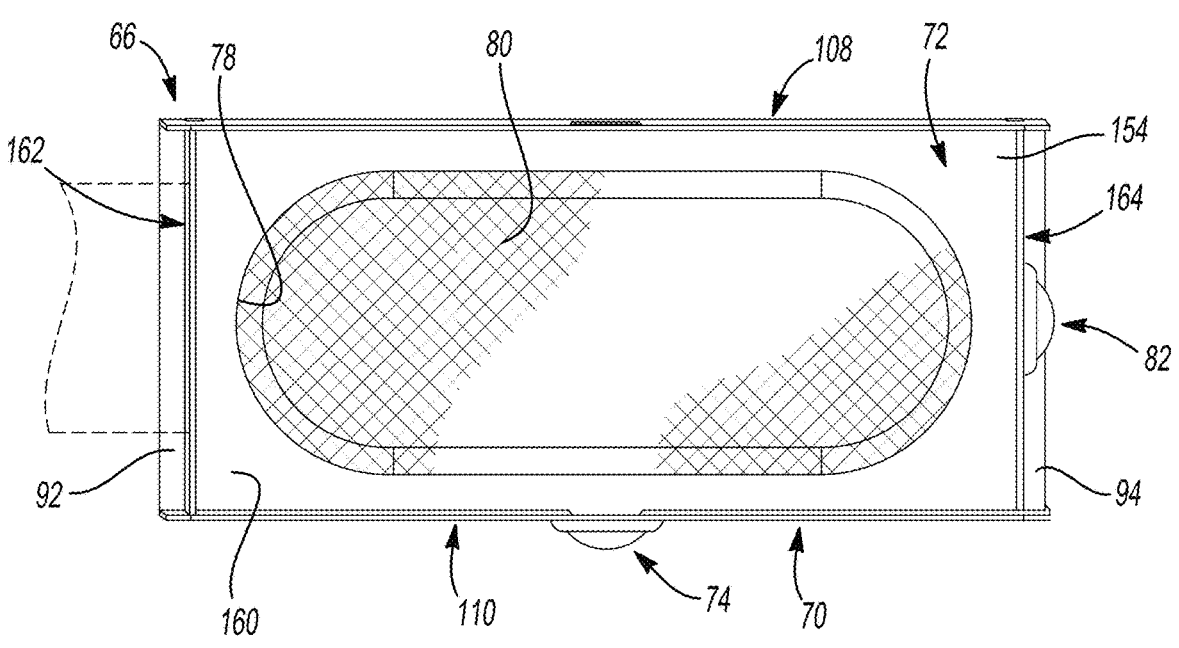
_Fig-5_
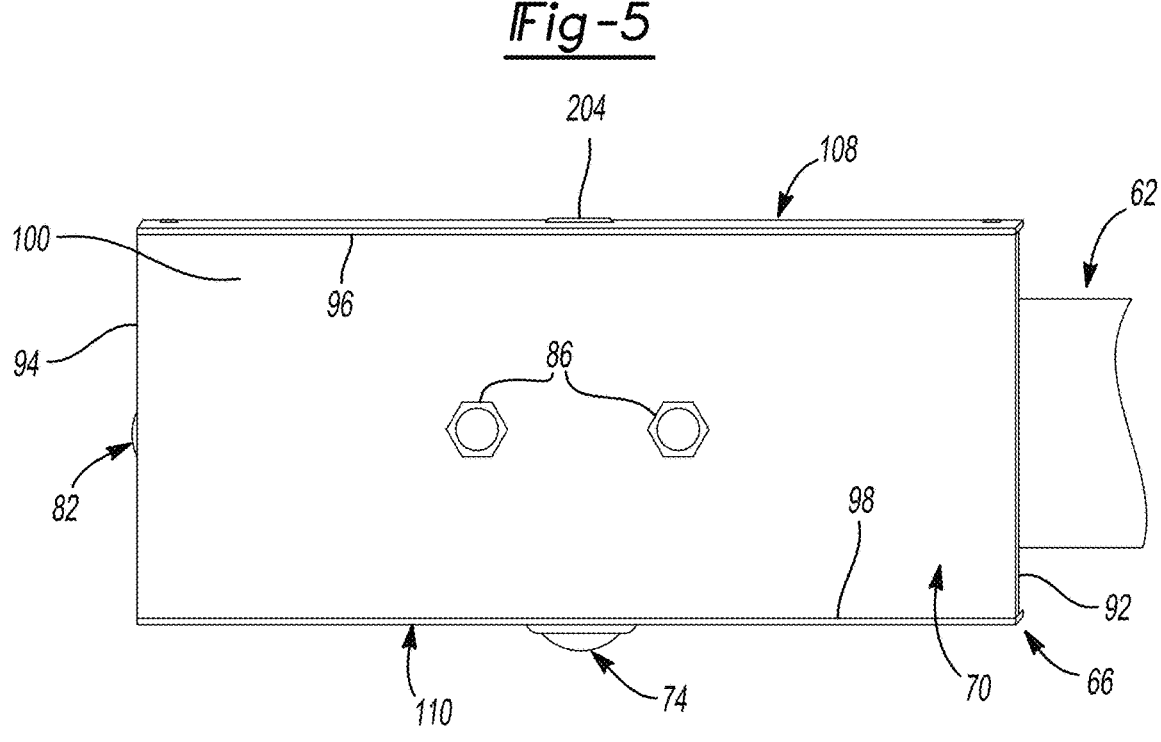
_Fig-6_

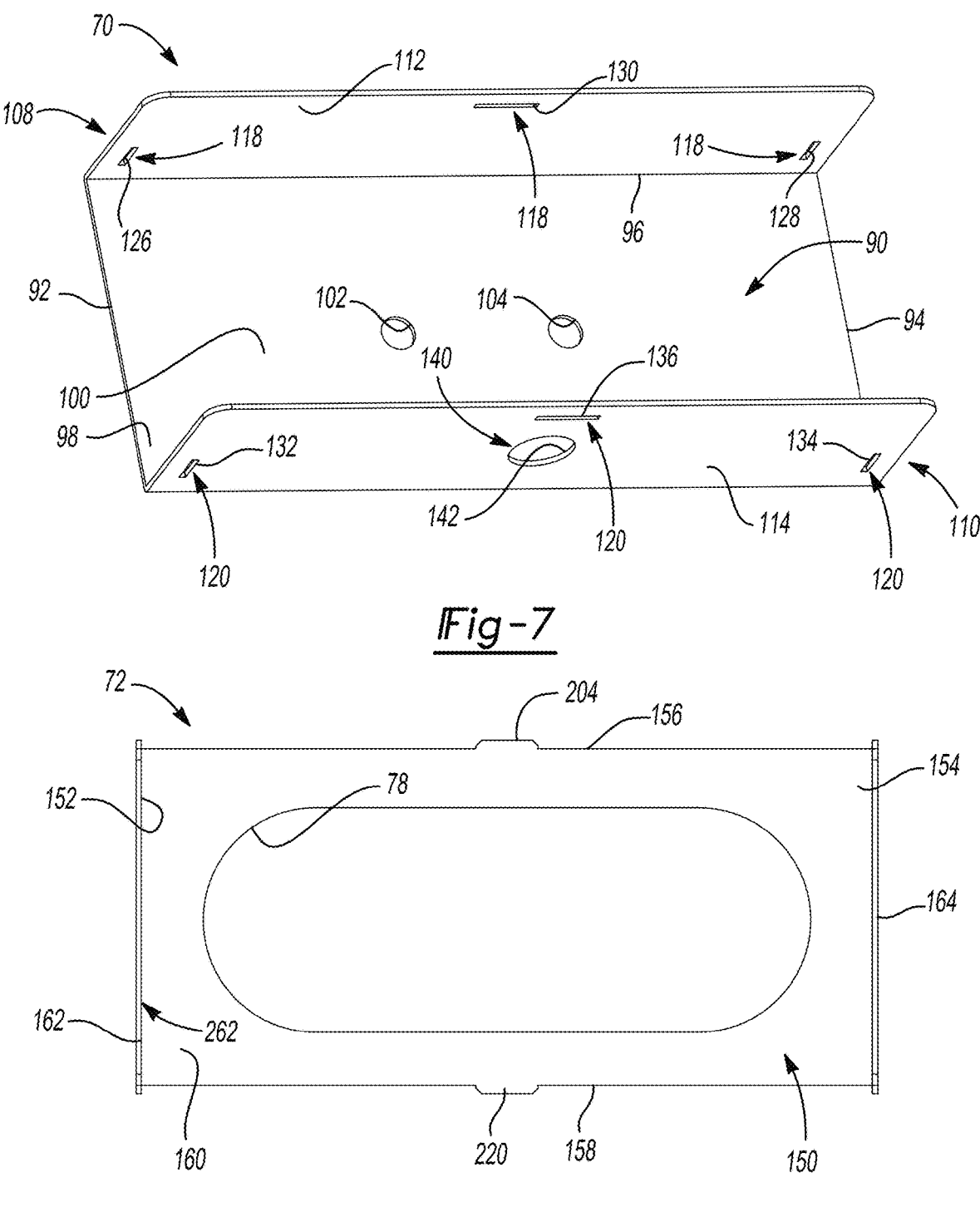
_Fig-7_
_Fig-8_

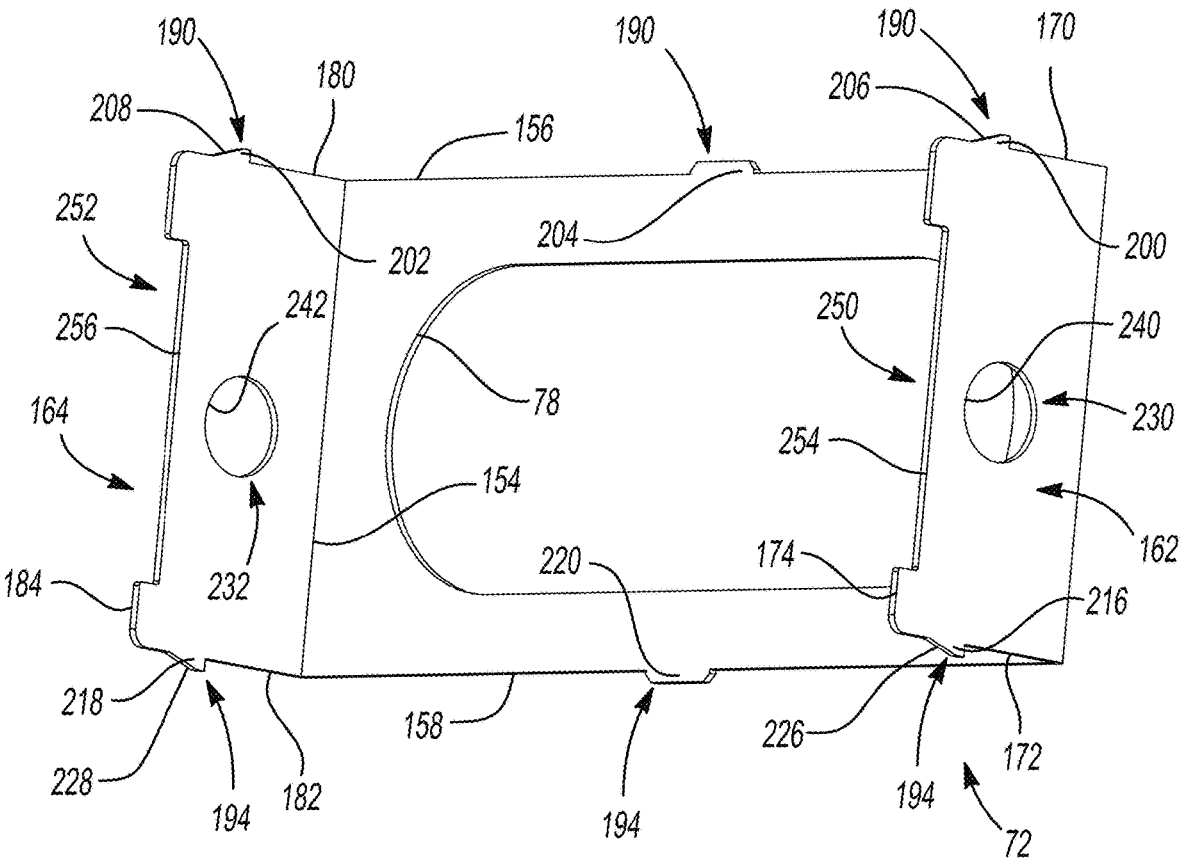
_Fig-9_

UNIVERSAL TAIL LIGHT ENCLOSURE FOR A TOWED VEHICLE

FIELD

The present disclosure relates to the art of towed vehicles and, more particularly, to a universal tail light enclosure for a towed vehicle.

BACKGROUND

This section provides background information related to the present disclosure and is not necessarily prior art.

Towed vehicles come in many forms, including recreational vehicles, flatbed trailers, box trailers, utility trailers, and the like. Regardless of the form, the towed vehicle includes tail lights that provide a visible indication to other drivers of brake application, upcoming turns, and the like. Currently, the tail lights are mounted in side-specific welded enclosures that are attached to rear frame members.

Towed vehicles are often used to haul building materials, land scaping materials, furniture, garbage, vehicles, and other cargo. Loading and unloading the towed vehicle can often lead to impacts on the tail light enclosures. Further, as the towed vehicles are often backed-in to load or unload, the tail light often suffer from unintentional impacts. The impacts often require replacement of the enclosure. Given that enclosures are side specific, there is need to warehouse left and right side enclosures to meet the needs of consumers. Further as the enclosures typically included welded components, replacement often requires specialty tools.

SUMMARY

This section provides a general summary of the disclosure and is not a comprehensive disclosure of its full scope or all of its features.

A universal tail light enclosure, in accordance with the present disclosure, includes a rear housing member including a base plate having a first end, a second end, a first side and a second side. The first side and the second side extend between and connect with the first end and the second end. A first mounting plate including a first plurality of connector members projects substantially perpendicularly from base plate along the first side, and a second mounting plate including a second plurality of connector members projects substantially perpendicularly from the base plate along the second side. A front housing member includes a light support plate having a first end portion, a second end portion, a first side portion, and a second side portion. The first side portion and the second side portion extend between and connect with the first end portion and the second end portion. A first side plate extends substantially perpendicularly from the first end portion. The first side plate includes a first plurality of connector elements and a first mounting section. A second side plate extends substantially perpendicularly from the second end portion. The second side plate includes a second plurality of connector elements and a second mounting section. The first plurality of connector members is configured to snap-fittingly engage with the first plurality of connector elements and the second plurality of connector members is configured to snap-fitting engage with the second plurality of connector elements to secure the front housing member to the rear housing member. The universal tail light enclosure being configured to mount to a trailer light support through either the first mounting section or the second mounting section.

In other features, the front housing member includes a third plurality of connector members, a first portion of the third plurality of connector members being arranged on the first side portion and a second portion of the third plurality of connector members being arranged on the second side portion.

In other features, the first portion of the third plurality of connector members are configured to snap-fittingly engage with select ones of the first plurality of connector elements and the second portion of the third plurality of connector members are configured to snap-fittingly engage with select ones of the second plurality of connector elements.

In other features, the first plurality of connector elements includes a first slot arranged on the first mounting plate adjacent the first end, a second slot arranged on the first mounting plate adjacent the second end, and a third slot arranged on the first mounting plate between the first slot and the second slot.

In other features, the first slot and the second slot include a first orientation and the third slot includes a second orientation that is substantially perpendicular relative to the first orientation.

In other features, the second plurality of connector elements includes a first slot element arranged on the second mounting plate adjacent the first end, a second slot element arranged on the second mounting plate adjacent the second end, and a third slot element arranged on the second mounting plate between the first slot element and the second slot element.

In other features, the first side plate includes a first edge, a second edge opposite the first edge, and a third edge that extends between and connects with the first edge and the second edge, the first plurality of connector members includes a first barb formed on the first edge, and the second plurality of connector members includes a first barb element formed on the second edge, the first mounting section including a first recess formed in the third edge.

In other features, the second side plate includes a first edge portion, a second edge portion opposite the first edge portion, and a third edge portion that extends between and connects with the first edge portion and the second edge portion, the first plurality of connector members includes a second barb formed on the first edge portion, and the second plurality of connector members includes a second barb element formed on the second edge, the first mounting section including a second recess formed in the third edge.

In other features, the first side plate of the front housing member includes an electrical connector mounting portion, and the second side plate of the front housing member includes one of a light mounting portion.

In other features, the second mounting plate includes a light mounting element configured to support a downwardly facing light fixture.

A towed vehicle, in accordance with the present disclosure, includes a frame including a forward end supporting a tow bracket and a rearward end. A first tail light mounting bracket extends from the rearward end in a first direction and a second tail light mounting bracket extends from the rearward end in a second direction opposite the first direction. A first universal tail light enclosure is mounted to the first tail light mounting bracket and a second universal tail light enclosure is mounted to the second tail light mounting bracket. Each of the first universal tail light enclosure and the second universal tail light enclosure includes a rear housing member including a base plate having a first end, a second end, a first side and a second side. The first side and the second side extend between and connect with the first end and the second end. A first mounting plate including a first plurality of connector members projects substantially perpendicularly from base plate along the first side, and a second mounting plate including a second plurality of connector members projects substantially perpendicularly from the base plate along the second side. A front housing member includes a light support plate having a first end portion, a second end portion, a first side portion, and a second side portion. The first side portion and the second side portion extend between and connect with the first end portion and the second end portion. A first side plate extends substantially perpendicularly from the first end portion. The first side plate includes a first plurality of connector elements and a first mounting section. A second side plate extends substantially perpendicularly from the second end portion. The second side plate includes a second plurality of connector elements and a second mounting section. The first plurality of connector members is configured to snap-fittingly engage with the first plurality of connector elements and the second plurality of connector members is configured to snap-fitting engage with the second plurality of connector elements to secure the front housing member to the rear housing member. The universal tail light enclosure being configured to mount to a trailer light support through either the first mounting section or the second mounting section.

In other features, the front housing member includes a third plurality of connector members, a first portion of the third plurality of connector members being arranged on the first side portion and a second portion of the third plurality of connector members being arranged on the second side portion.

In other features, the first portion of the third plurality of connector members are configured to snap-fittingly engage with select ones of the first plurality of connector elements and the second portion of the third plurality of connector members are configured to snap-fittingly engage with select ones of the second plurality of connector elements.

In other features, the first plurality of connector elements includes a first slot arranged on the first mounting plate adjacent the first end, a second slot arranged on the first mounting plate adjacent the second end, and a third slot arranged on the first mounting plate between the first slot and the second slot.

In other features, the first slot and the second slot include a first orientation and the third slot includes a second orientation that is substantially perpendicular relative to the first orientation.

In other features, the second plurality of connector elements includes a first slot element arranged on the second mounting plate adjacent the first end, a second slot element arranged on the second mounting plate adjacent the second end, and a third slot element arranged on the second mounting plate between the first slot element and the second slot element.

In other features, the first side plate includes a first edge, a second edge opposite the first edge, and a third edge that extends between and connects with the first edge and the second edge, the first plurality of connector members includes a first barb formed on the first edge, and the second plurality of connector members includes a first barb element formed on the second edge, the first mounting section including a first recess formed in the third edge.

In other features, the second side plate includes a first edge portion, a second edge portion opposite the first edge portion, and a third edge portion that extends between and connects with the first edge portion and the second edge portion, the first plurality of connector members includes a second barb formed on the first edge portion, and the second plurality of connector members includes a second barb element formed on the second edge, the first mounting section including a second recess formed in the third edge.

In other features, the first side plate of the front housing member includes an electrical connector mounting portion, and the second side plate of the front housing member includes a light mounting portion.

In other features, the second mounting plate includes a light mounting element configured to support a downwardly facing light fixture.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

FIG. 5 is a front plan view of the of the universal tail light enclosure of FIG. 3, in accordance with the present disclosure;

FIG. 6 is a rear view of the of the universal tail light enclosure of FIG. 3, in accordance with the present disclosure;

FIG. 7 is a perspective view of a rear housing member of the universal tail light enclosure of FIG. 3, in accordance with the present disclosure;

FIG. 8 is a front plan view of a front housing member of the universal tail light enclosure of FIG. 3, in accordance with the present disclosure; and FIG. 9 is a rear perspective view of the front housing member of FIG. 12, in accordance with the present disclosure.

Corresponding reference numerals indicate corresponding parts throughout the several views of the drawings.

DETAILED DESCRIPTION

Example embodiments will now be described more fully with reference to the accompanying drawings.

Figure 1:
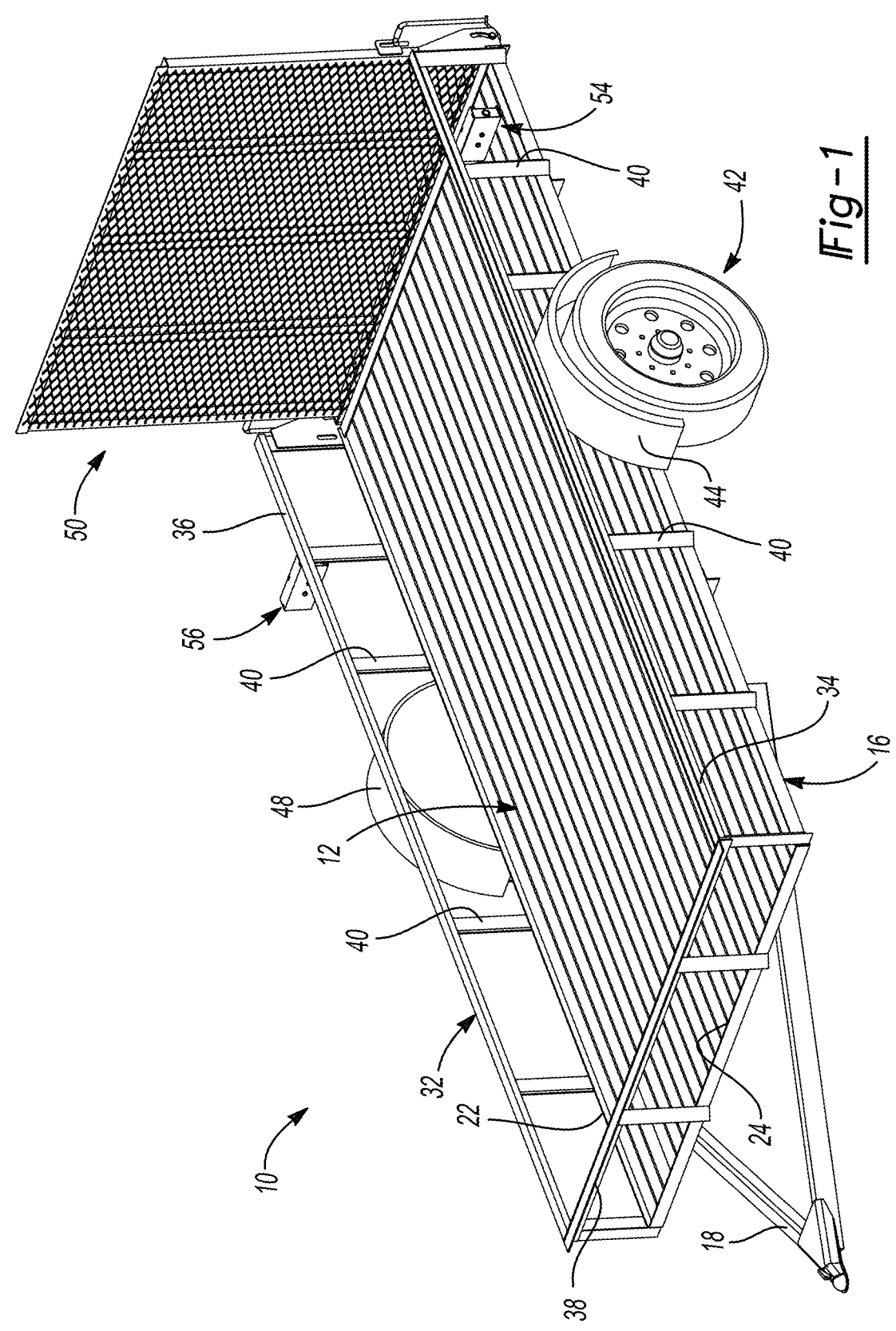
FIG. 1 is an upper left perspective view of a towed vehicle including a universal tail light enclosure, in accordance with the present disclosure.
Figure 2:
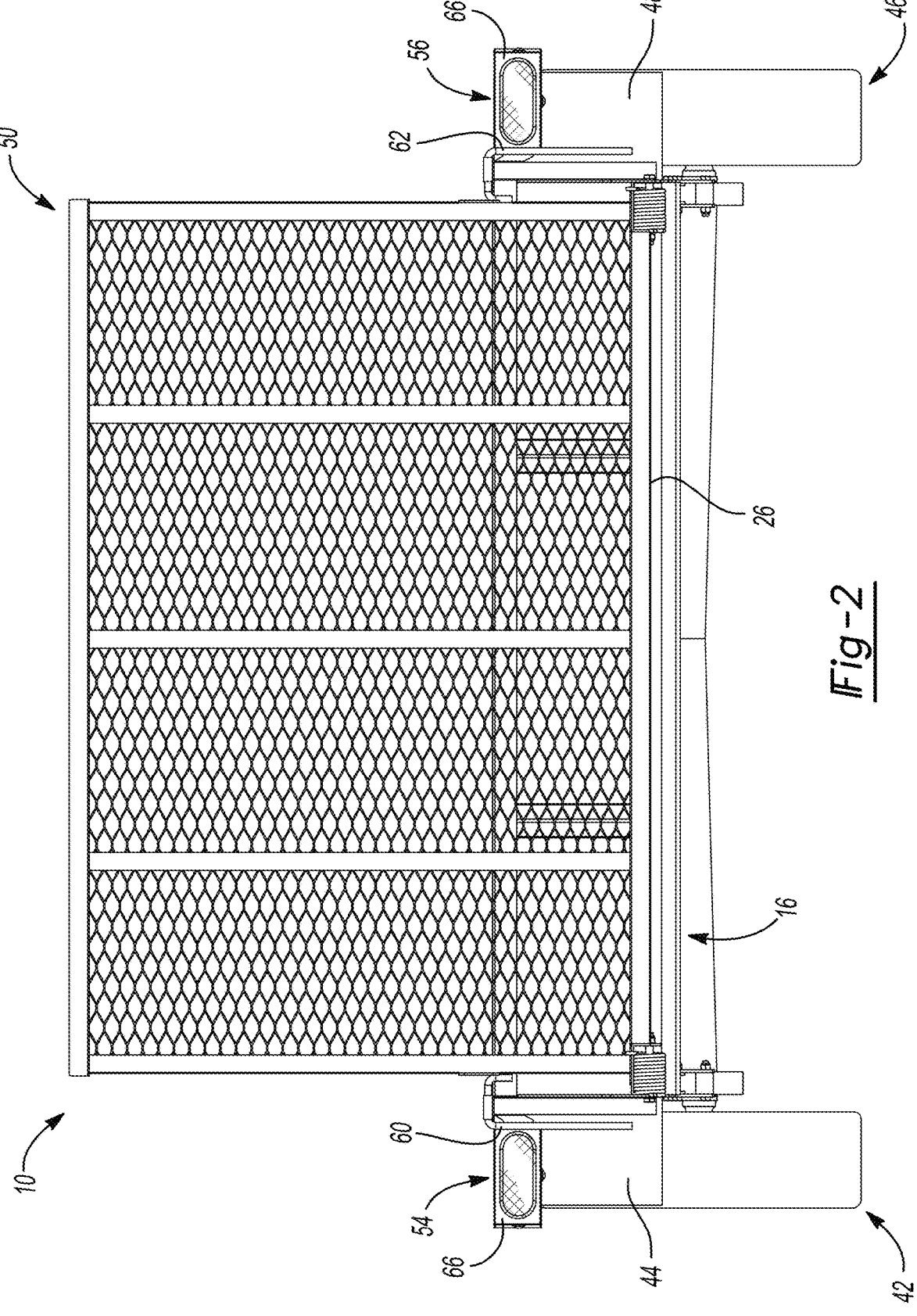
FIG. 2 is a rear view of the towed vehicle of FIG. 1, in accordance with the present disclosure.

A towed vehicle, shown in the form of a utility trailer, is indicated generally at 10 in FIGS. 1 and 2. Utility trailer 10 includes a trailer deck 12 having an upper support surface 14. Trailer deck 12 is supported by a frame 16 having a tow bracket (or coupler) 18. Upper support surface 14 is formed by a plurality of wooden planks (not separately labeled). Frame 16 includes a first side 20, a second side 22 that extends substantially parallel to first side 20, a forward end 24, and a rearward end 26. Forward end 24 and rearward end 26 extend between and connect with first side 20 and second side 22. Tow bracket 18 is connected at forward end 24.

Utility trailer 10 includes a rail system 32 that circumscribes a portion of trailer deck 12. In a non-limiting example, rail system 32 includes a first rail 34 that extends along first side 20, a second rail 36 that extends along second side 22, and a third rail 38 that extends along forward end 24 and connects between first rail 34 and second rail 36. Rail system 32 is connected to frame 16 though a plurality of rail supports indicated at 40.

Utility trailer 10 is further shown to include a first wheel 42 having a first fender 44 supported at first side 20 and a second wheel 46 having a second fender 48 supported at second side 22. The number of wheels may vary. Each wheel 42, 46 may have an independent axle (not shown) or be supported by a common axle (also not shown). A trailer gate 50 is pivotally mounted to frame 16 at rearward end 26. At this point, it should be understood that while described as a utility trailer 10, the towed vehicle may take on various forms including, for example, box trailers, dump trailers, boat trailers, flatbed trailers, recreational vehicle (RV) trailers, and the like.

A first tail light 54 is mounted to one of the plurality of rail supports 40 supporting first rail 34 and a second tail light 56 is mounted to another of the plurality of rail supports 40 supporting second rail 36. First tail light 54 defines a left side tail light (not separately labeled) and second tail light 56 defines a right side tail light (also not separately labeled). First tail light 54 connected to the one of the plurality of rail supports 40 through a first tail light mounting bracket 60 and second tail light 56 is mounted to the other of the plurality of rail supports 40 through a second tail light mounting bracket 64. First tail light mounting bracket 60 and second tail light mounting bracket 62 take the form of flat steel bars (not separately labeled) that may be welded to corresponding ones of the plurality of rail supports 40.

Figures 3, 4:
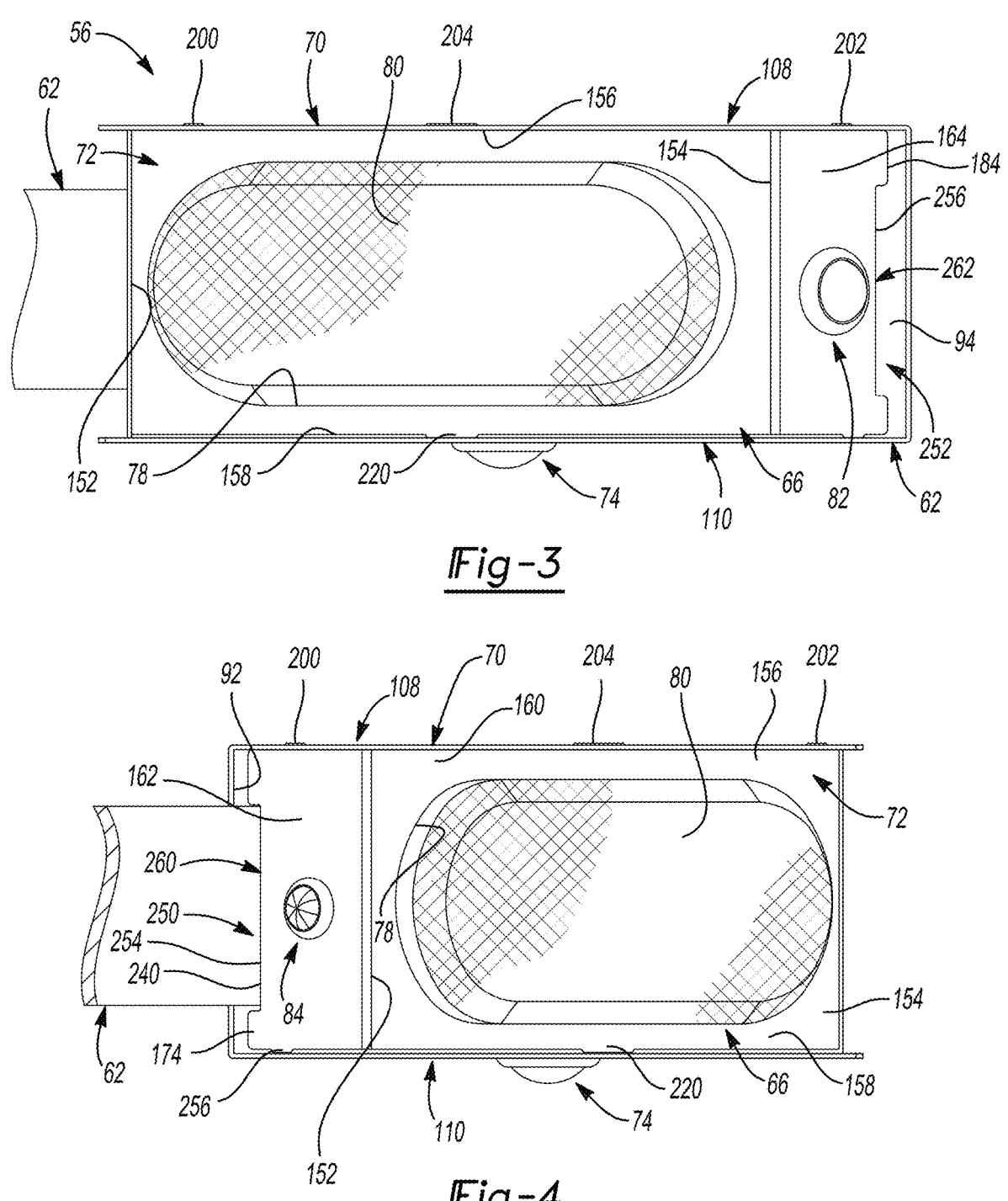
FIG. 3 is a lower right perspective view of a left side tail light enclosure, in accordance with the present disclosure.
FIG. 4 is a lower left perspective view of the universal tail light enclosure of FIG. 3, in accordance with the present disclosure.

In accordance with the present disclosure, each of the first tail light 54 and the second tail light 56 is mounted in a universal tail light enclosure 66. That is, the tail light enclosure is suitable for mounting on either the left side or the right side of towed vehicle 10 without the need for structural modifications. As shown in FIG. 3, universal tail light enclosure 66 includes a rear housing member 70 and a front housing member 72.

Front housing member 72 is snap-fittingly secured to rear housing member 70. Rear housing member 70 supports a downwardly facing light fixture 74 that may be used to illuminate a license plate and front housing member 72 includes a central opening 78 that supports a tail light lens 80. Front housing member 72 may also support an outwardly facing light fixture 82 that may be used as a side marker, a clearance light, for example.

Referring to FIGS. 4, 5, and 6, and with continued reference to FIG. 3 front housing member 72 also supports an electrical connector 84 that provides passage for electrical conductors (not shown) that provide power to downwardly facing light fixture 74, outwardly facing light fixture 82, and a tail light fixture (also not shown). Rear housing member 70 is shown to support fasteners 86 that are used to secure universal tail light enclosure 66 to either one of first tail light mounting bracket 60 or second tail light mounting bracket 62 depending on installation preference.

Reference will now follow to FIG. 7 in describing rear housing member 70 in accordance with a non-limiting example. Rear housing member 70 includes a base plate 90 including a first end 92, a second end 94, a first side 96 and a second side 98. Second end 94 is opposite to first end 92. First side 96 and second side 98 extend between and connect with first end 92 and second end 94. First end 92, second end 94, first side 96 and second side 98 connectively define a substantially planar surface 100. Substantially planar surface 100 includes a first opening 102 and a second opening 104 that provide passage for fasteners 86 to secure universal tail light enclosure 66 to either one of first tail light mounting bracket 60 and second tail light mounting bracket 62.

In accordance with the present disclosure, rear housing member 70 includes a first mounting plate 108 connected to base plate 90 along first side 96 and a second mounting plate 110 that is connected to base plate 90 along second side 98. First mounting plate 108 and second mounting plate 110 support front housing member 72 to rear housing member 70. First mounting plate 108 includes a first mounting surface 112 and second mounting plate 110 includes a second mounting surface 114.

First mounting surface 112 includes a first plurality of connector members 118 and second mounting surface includes a second plurality of connector members 120. The first plurality of connector members 118 in first mounting plate 108 includes a first slot 126, a second slot 128, and a third slot 130. First slot 126 and second slot 128 include a first orientation, e.g., substantially parallel to first end 92 and second end 94 and third slot 130 includes a second orientation that is distinct from the first orientation, e.g., substantially parallel to first side 96.

The second plurality of connector members 120 in second mounting plate 110 includes a first slot element 132, a second slot element 134, and a third slot element 136. First slot element 132 and second slot element 134 include the first orientation, e.g., substantially parallel to first end 92 and second end 94 and third slot element 136 includes the second orientation, e.g., substantially parallel to first side 96. Second mounting plate 110 is also shown to include a first light mounting element 140 shown in the form of a circular opening 142.

Reference will now follow to FIG. 8 in describing front housing member 72 in accordance with the present disclosure. Front housing member 72 includes a light support plate 150 including a first end portion 152, a second end portion 154, a first side portion 156, and a second side portion 158. First end portion 152, second end portion 154, first side portion 156, and second side portion 158 collectively define a substantially planar surface portion 160 that includes central opening 78 and supports tail light lens 80.

Front housing member 72 also includes a first side plate 162 that projects substantially perpendicularly from first end portion 152 of light support plate 150 and a second side plate 164 that extends substantially perpendicularly from second end portion 154 of light support plate 150. As shown in FIG. 9, first side plate 162 includes a first edge 170, a second edge 172 that is opposite of and substantially parallel to first edge 170, and a third edge 174. Third edge 174 extends between and connects with first edge 170 and second edge 172.

Similarly, second side plate 164 includes a first edge portion 180, a second edge portion 182 that is opposite of and substantially parallel to first edge portion 180, and a third edge 184. Third edge 184 extends between and connects with first edge portion 180 and second edge portion 182. In accordance with the present disclosure, front housing member 72 includes a first plurality of connector elements 190 provided first side portion 156, first edge 170 of first side plate 162, and first edge portion 180 of second side plate 164.

Front housing member 72 also includes a second plurality of connector elements 194 arranged on second side portion 158, second edge 172 of first side plate 162, and second edge portion 182 of second side plate 164. As will be detailed more fully herein, the first plurality of connector elements 190 snap-fit into corresponding ones of the first plurality of connector members 118 and the second plurality of connector elements 194 snap-fit into corresponding ones of the second plurality of connector members 120.

First plurality of connector elements 190 include a first barb 200 arranged on first edge 170 of first side plate 162, a second barb 202 arranged on second edge 172 of second side plate 164, and a first tab 204 arranged on first side portion 156. First barb 200 includes a first angled surface 206 and second barb 202 includes a second angled surface 208. Second plurality of connector elements 194 include a first barb element 216 arranged on first edge portion 180, a second barb element 218 arranged on second edge portion 182, and a first tab element 220 arranged on second side portion 158. First barb element 216 includes a first angled surface portion 226 and second barb element 218 includes a second angled surface portion 228. First side plate 162 also includes a first side opening 230 and second side plate 164 includes a second side opening 232.

When connecting front housing member 72 to rear housing member 70 first angled surface 206 of first barb 200 and second angled surface 208 of second barb 202 engage with and inner surface of first mounting plate 108. Likewise, first angled surface portion 226 of first barb element 216 and second angled surface portion 228 of second barb element 218 engage an inner surface of second mounting plate 110. As front housing member 72 is engaged with rear housing member 70, the angled surfaces 206 and 208 and the angled surface portions 226 and 228 force first mounting plate 108 and second mounting plate outward.

When first barb 200, second barb 202, and first tab 204 engage into corresponding ones of the first plurality of connector members 118, first mounting plate 108 returns inwardly. Similarly, when first barb element 216, second barb element 218, and first tab element 220 engage into corresponding ones of the second plurality of connector members 120, second mounting plate 110 returns thereby establishing a snap-fit between front housing member 72 and rear housing member 70.

Depending on whether universal tail light enclosure is mounted on the left of the right side of towed vehicle 10, first side opening 230 may take the form of an electrical connector mounting portion 240 that supports electrical connector 84 and second side opening 232 may take the form of a first light fixture mounting portion 242 that supports outwardly facing light fixture 82. Of course, the particular side for electrical connector 84 and outwardly facing light fixture 82 may be reversed.

In further accordance with the present disclosure, first side plate 162 includes a first mounting section 250 and second side plate 164 includes a second mounting section 252. First mounting section 250 takes the form of a first recess 254 and second mounting section 252 takes the form of a second recess 256. When front housing member 72 is mounted to rear housing member 70, first recess 254 in first side plate 162, together with first end 92 of base plate 90 form a first generally rectangular opening 260 and second recess 256, in second side plate 164, together with second end 94 of base plate 90 form a second generally rectangular recess 262.

In order to join front housing member 72 to rear housing member 70, after making any necessary electrical connections, first mounting plate 108 and second mounting plate 110 may be flexed outwardly. At this point, the first plurality of connector elements 190 are fitted into corresponding ones of the first plurality of connector member 118 and the second plurality of connector elements 194 are fitted into corresponding ones of the second plurality of connector members 120.

At this point, universal tail light enclosure 66 is mounted to towed vehicle by sliding one of the first tail light mounting bracket 60 and the second tail light mounting bracket 62 into a corresponding one of the first generally rectangular opening 260 (FIG. 4) and second the second generally rectangular recess 262 (FIG. 3). Fasteners 86 are passed through corresponding ones of first opening 102 and second opening 104 that threadedly engaged with corresponding threaded openings (not shown) in first tail light mounting bracket 60 and the second tail light mounting bracket 62. With this construction, universal tail light enclosure 66 may be configured for either right side or left side mounting thereby reducing an overall number of tail light enclosures that may need to be stored by a repair or parts facility.

Exemplary embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A universal tail light enclosure for a towed vehicle comprising:

a rear housing member including a base plate having a first end, a second end, a first side and a second side, the first side and the second side extending between and connecting with the first end and the second end, a first mounting plate including a first plurality of connector members projects substantially perpendicularly from the base plate along the first side, and a second mounting plate including a second plurality of connector members projects substantially perpendicularly from the base plate along the second side; and a front housing member including a light support plate having a first end portion, a second end portion, a first side portion, and a second side portion, the first side portion and the second side portion extending between and connecting with the first end portion and the second end portion, a first side plate extending substantially perpendicularly from the first end portion, the first side plate including a first plurality of connector elements and a first mounting section, and a second side plate extending substantially perpendicularly from the second end portion, the second side plate including a second plurality of connector elements and a second mounting section, the first plurality of connector members being configured to snap-fittingly engage with the first plurality of connector elements and the second plurality of connector members being configured to snap-fitting engage with the second plurality of connector elements to secure the front housing member to the rear housing member, the universal tail light enclosure being configured to mount to a trailer light support through either the first mounting section or the second mounting section.

2. The universal tail light enclosure according to claim 1, wherein the front housing member includes a third plurality of connector members, a first portion of the third plurality of connector members being arranged on the first side portion and a second portion of the third plurality of connector members being arranged on the second side portion.

3. The universal tail light enclosure according to claim 2, wherein the first portion of the third plurality of connector members are configured to snap-fittingly engage with select ones of the first plurality of connector elements and the second portion of the third plurality of connector members are configured to snap-fittingly engage with select ones of the second plurality of connector elements.

4. The universal tail light enclosure according to claim 3, wherein the first plurality of connector elements includes a first slot arranged on the first mounting plate adjacent the first end, a second slot arranged on the first mounting plate adjacent the second end, and a third slot arranged on the first mounting plate between the first slot and the second slot.

5. The universal tail light enclosure according to claim 4, wherein the first slot and the second slot include a first orientation and the third slot includes a second orientation that is substantially perpendicular relative to the first orientation.

6. The universal tail light enclosure according to claim 4, wherein the second plurality of connector elements includes a first slot element arranged on the second mounting plate adjacent the first end, a second slot element arranged on the second mounting plate adjacent the second end, and a third slot element arranged on the second mounting plate between the first slot element and the second slot element.

7. The universal tail light enclosure according to claim 6, wherein the first side plate includes a first edge, a second edge opposite the first edge, and a third edge that extends between and connects with the first edge and the second edge, the first plurality of connector members includes a first barb formed on the first edge, and the second plurality of connector members includes a first barb element formed on the second edge, the first mounting section including a first recess formed in the third edge.

8. The universal tail light enclosure according to claim 7, wherein the second side plate includes a first edge portion, a second edge portion opposite the first edge portion, and a third edge portion that extends between and connects with the first edge portion and the second edge portion, the first plurality of connector members includes a second barb formed on the first edge portion, and the second plurality of connector members includes a second barb element formed on the second edge, the first mounting section including a second recess formed in the third edge.

9. The universal tail light enclosure according to claim 1, wherein the first side plate of the front housing member includes an electrical connector mounting portion, and the second side plate of the front housing member includes one of a light mounting portion.

10. The universal tail light enclosure according to claim 1, wherein the second mounting plate includes a light mounting element configured to support a downwardly facing light fixture.

11. A towed vehicle comprising:

a frame including a forward end supporting a tow bracket and a rearward end;

a first tail light mounting bracket extending from the rearward end in a first direction and a second tail light mounting bracket extending from the rearward end in a second direction opposite the first direction;

a first universal tail light enclosure mounted to the first tail light mounting bracket and a second universal tail light enclosure mounted to the second tail light mounting bracket, each of the first universal tail light enclosure and the second universal tail light enclosure comprising:

a rear housing member including a base plate having a first end, a second end, a first side and a second side, the first side and the second side extending between and connecting with the first end and the second end, a first mounting plate including a first plurality of connector members projects substantially perpendicularly from the base plate along the first side, and a second mounting plate including a second plurality of connector members projects substantially perpendicularly from the base plate along the second side; and a front housing member including a light support plate having a first end portion, a second end portion, a first side portion, and a second side portion, the first side portion and the second side portion extending between and connecting with the first end portion and the second end portion, a first side plate extending substantially perpendicularly from the first end portion, the first side plate including a first plurality of connector elements and a first mounting section receptive of one of the first tail light mounting bracket and the second tail light mounting bracket, and a second side plate extending substantially perpendicularly from the second end portion, the second side plate including a second plurality of connector elements and a second mounting section receptive of the other of the first tail light mounting bracket and the second tail light mounting bracket, the first plurality of connector members being configured to snap-fittingly engage with the first plurality of connector elements and the second plurality of connector members being configured to snap-fittingly engage with the second plurality of connector elements to secure the front housing member to the rear housing member, each of the first universal tail light enclosure and second universal tail light enclosure being configured to mount to a trailer light support through a corresponding one of the first mounting section or the second mounting section.

12. The towed vehicle according to claim 11, wherein the front housing member includes a third plurality of connector members, a first portion of the third plurality of connector members being arranged on the first side portion and a second portion of the third plurality of connector members being arranged on the second side portion.

13. The towed vehicle according to claim 12, wherein the first portion of the third plurality of connector members are configured to snap-fittingly engage with select ones of the first plurality of connector elements and the second portion of the third plurality of connector members are configured to snap-fittingly engage with select ones of the second plurality of connector elements.

14. The towed vehicle according to claim 13, wherein the first plurality of connector elements includes a first slot arranged on the first mounting plate adjacent the first end, a second slot arranged on the first mounting plate adjacent the second end, and a third slot arranged on the first mounting plate between the first slot and the second slot.

15. The towed vehicle according to claim 14, wherein the first slot and the second slot include a first orientation and the third slot includes a second orientation that is substantially perpendicular relative to the first orientation.

16. The towed vehicle according to claim 14, wherein the second plurality of connector elements includes a first slot element arranged on the second mounting plate adjacent the first end, a second slot element arranged on the second mounting plate adjacent the second end, and a third slot element arranged on the second mounting plate between the first slot element and the second slot element.

17. The towed vehicle according to claim 16, wherein the first side plate includes a first edge, a second edge opposite the first edge, and a third edge that extends between and connects with the first edge and the second edge, the first plurality of connector members includes a first barb formed on the first edge, and the second plurality of connector members includes a first barb element formed on the second edge, the first mounting section including a first recess formed in the third edge.

18. The towed vehicle according to claim 17, wherein the second side plate includes a first edge portion, a second edge portion opposite the first edge portion, and a third edge portion that extends between and connects with the first edge portion and the second edge portion, the first plurality of connector members includes a second barb formed on the first edge portion, and the second plurality of connector members includes a second barb element formed on the second edge, the first mounting section including a second recess formed in the third edge.

19. The towed vehicle according to claim 11, wherein the first side plate of the front housing member includes an electrical connector mounting portion, and the second side plate of the front housing member includes a light mounting portion.

20. The towed vehicle according to claim 11, wherein the second mounting plate includes a light mounting element configured to support a downwardly facing light fixture.

* * * * *